Feb. 25, 1958 R. J. POULIN 2,824,397
FILM-SLIDE MOUNTING DEVICES
Filed Oct. 25, 1956 2 Sheets-Sheet 2

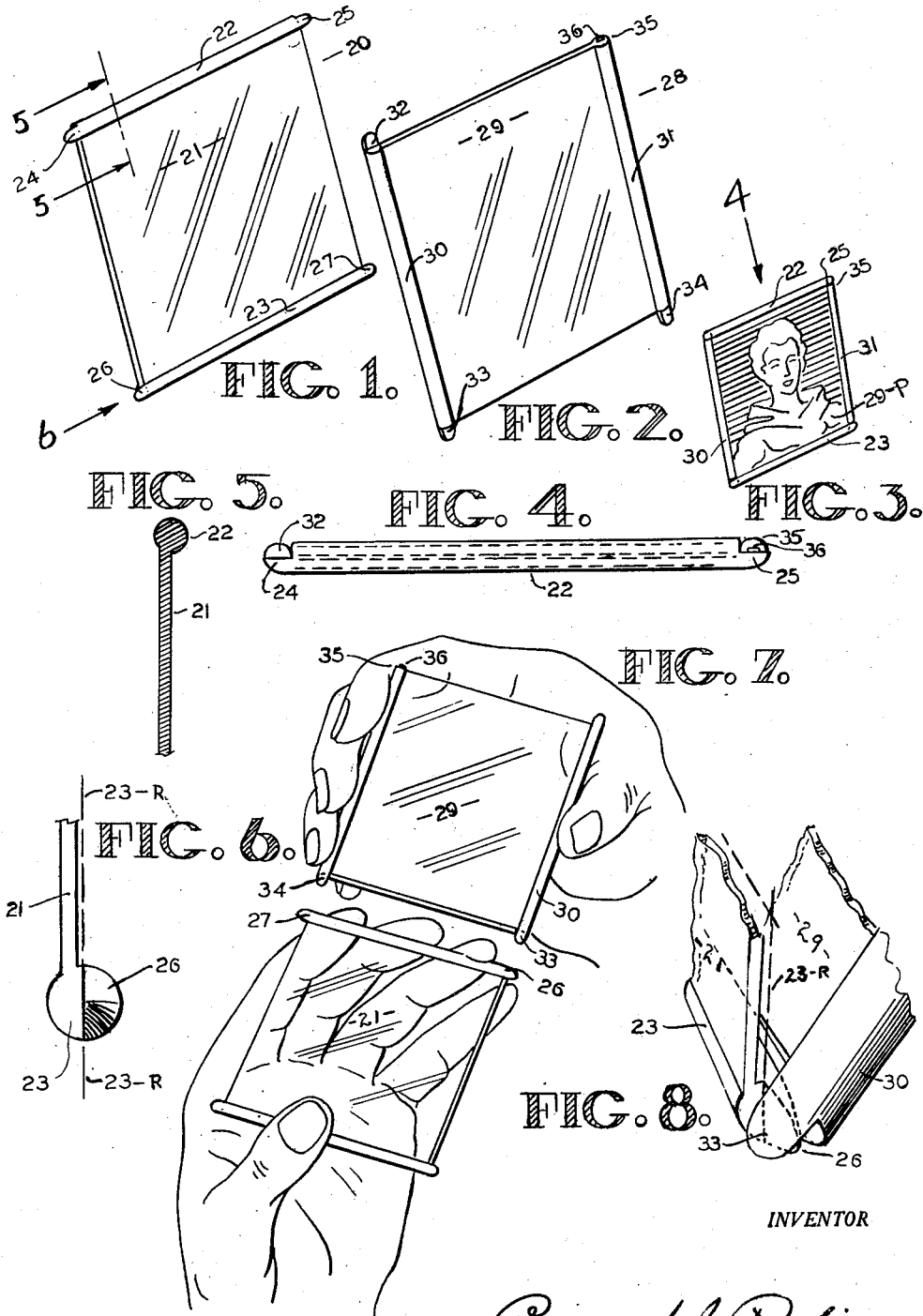

INVENTOR
Raymond J. Poulin

United States Patent Office 2,824,397
Patented Feb. 25, 1958

2,824,397

FILM-SLIDE MOUNTING DEVICES

Raymond J. Poulin, Topanga, Calif., assignor of one-half to Edward H. Rose, Santa Monica, Calif.

Application October 25, 1956, Serial No. 618,238

8 Claims. (Cl. 40—152)

This invention relates to frames and other devices for supporting and protecting sections of transparent film to be shown in slide projectors, and more particularly to an improved mounting device which completely encloses the section of film and holds it evenly in a single plane and which, furthermore, is provided with peripheral bearing surfaces which protect tthe mount itself from damage while being handled, stored or projected.

Since the film which is used in small cameras is generally available only in roll form, it has no planar stability and tends constantly to re-curl into its original roll form even when cut to the size of the individual pictures. This makes it doubly difficult to handle and to manipulate the individual pieces of film, and practically impossible to insert such a film into a projector.

As a consequence, it has been the general practice to support each picture-size section of film between some type of frames. The most commonly used frame for this purpose consists of two sections of cardboard having generally rectangular round-cornered apertures aligning therein. The section of film to be mounted is cut from the film strip and positioned between the two juxtaposed cardboard frames which are then glued together along their contacting surfaces outwardly of the area of the film section.

In this type of mounting frame the film is provided general protection only when the slide is laid on a flat surface or when a plurality of slides is stacked in uniform superposition, or positioned vertically one against the next. However, they are not protected against damage from fingerprints or scratching from surface contacts with sharp objects. Lint and dust which collects on the surfaces of the film must be wiped away frequently. Further, there is the danger that the film section will shift relative to the apertures in the frame or become loose and completely disengaged therefrom. But possibly the most frequent source of annoyance to users of this type of mount is the variation in thickness of the cardboard used in the frames which results in throwing successive pictures slightly out of focus when they are projected.

A further problem commonly encountered in the projection of slides conformed with cardboard frames, particularly those of larger sizes such as 2¼ x 2¼, is the buckling and wrinkling of the film when subjected to the heat of the projection lamp with resultant indistinctness of the projected picture throughout the misaligned areas of the film.

My invention has been made with the foregoing considerations in mind and can be said to have a plurality of important objectives.

One important object of my invention is the provision of a device being adapted to hold a section of film in uniplanar positioning regardless of the projection lamp heat to which it is exposed.

Another important object of my invention is the provision of film mounting means being adapted to provide protection against fingerprinting and scratching of the opposite surfaces of the film while being stored, handled and projected.

A further important object of my invention is the provision of a mounting device of the character described being conformed with peripheral bearing surfaces which are effective to protect the opposite outer surfaces of the mounting device itself from scratches and abrasions.

An additional important object of my invention is the provision of a device of the character described which does not involve the use of adhesives and in which the film may be quickly positioned and just as easily removed without damage to the film section or to the interfitting parts of the mounting device.

In brief, the mounting device of my invention includes a pair of substantially identical, generally rectangular planar panels conformed of a generally rigid resinous substance, such as polystyrene, being transparent and sufficiently clear optically to prevent the distortion of images projected therethrough. Two opposite edges of each panel are square-cut in the normal manner, and the intermediate opposite edges are provided with integrally-formed rounded edge sections which are axially offset relative to the respective panel so that the portion thereof disposed outwardly of one surface of the panel is slightly more than half-round and only a thin arcuate section is disposed outwardly of the other surface. The half-round portions of the rounded edge sections are extended outwardly beyond the square-cut edges of the panels and are terminated in arcuately tapered end portions, one at each corner of the panel. And, when two panels are juxtaposed with the rounded edge sections of both positioned over the square-cut edges of the other, the end portions of one are positioned for overlapping engagement with those of the other to hold the panels together.

As can be understood, three end portions of one panel may be readily positioned behind three opposite end portions of the other panel; and on one panel in each pair there is provided a short stub end which is substantially reduced in length and size so that it may be forced, under pressure, beneath the adjacent end portion of the other panel, thus holding the panels firmly but removably engaged.

Since the offset portions of both pairs of rounded edge sections is slightly greater than half-round, an interspace is provided between the two panels in which a section of film and a framing mask are receivable.

Certain variations of the embodiment above described and various additional objects of the invention will become apparent to persons conversant with the art upon examination of the following detailed specification of one preferred form together with the references contained therein to the accompanying drawings, of which:

Figure 1 is a diagrammatic frontal view in perspective of one of a pair of mating parts adapted for interfitting engagement to form one of the mounting devices of my invention;

Figure 2 is a perspective view similar to Figure 1 showing the other of the two mating parts;

Figure 3 is a frontal perspective view similar in positioning in space to Figures 1 and 2, and showing the mating parts assembled with an image-bearing section of film disposed therebetween;

Figure 4 is a diagrammatic plan view showing the upper edge of the mounting device as it would appear when viewed from the direction of arrow 4 in Figure 3;

Figure 5 is a sectional fragmentary view of a panel taken along the line and in the direction of the arrows 5—5 in Figure 1;

Figure 6 is a fragmentary side view of a mounting panel shown as it would appear when seen from the direction of the arrow 6 in Figure 1;

Figure 7 is a diagrammatic perspective view showing the manner in which the interfitting panels are positioned ready for assembly;

Figure 8 is a fragmentary schematic diagram substantially enlarged to show more clearly the manner in which the end portions of one part overlap those of the other;

Figure 9:
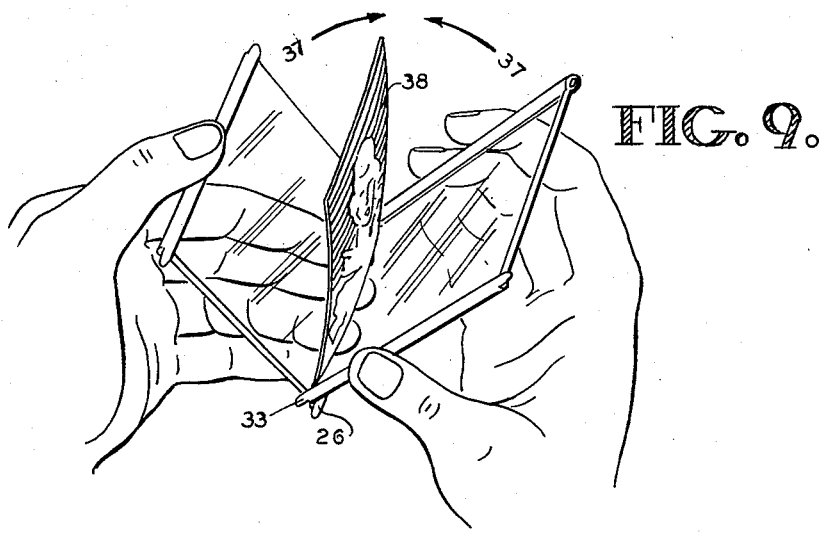
Figure 9 is a perspective view similar to that of Figure 7, showing the first step in the assembly of the device of my invention with the parts and the film section to be enclosed therein relatively positioned.

Reference is again made to Figures 1 and 2 which show the two mating parts constructed according to my invention, which when attached together cooperate to provide the film-slide mounting device shown in Figure 3 with a section of film enclosed therein.

The two parts, indicated generally by the numerals 20 and 28, have planar panels 21 and 29 conformed of a transparent rigid substance such as polystyrene, each of the panels having two square-cut edges, seen as vertical sides in Figure 1 and at the top and bottom in Figure 2, and intermediate rounded edge sections such as 22 and 23 in Figure 1, and 30 and 31 in Figure 2. Portions of the rounded edges are extended outwardly and adapted to overlap and engage respective portions on a second panel to hold a film section such as 29-P enclosed therebetween.

For a better understanding of the manner in which the parts interfit, attention is directed to the part 20 in Figure 1 and to the fragmentary vertical section thereof, taken along the line and in the direction indicated by the arrows 5—5 and shown somewhat enlarged in Figure 5. In the latter view the positioning of the generally circular edge section 22 in relation to the panel 21 is clearly shown.

In the fragmentary side view of the panel 20 taken from the direction of the arrow 6 in Figure 1 and shown substantially enlarged in Figure 6, the rounded edge section 23 has been indicated, for the sake of descriptive clarity, as being divided axio-diametrically by the line of reference 23-R which is disposed parallel to the surfaces of the panel 21. It will also be observed that the point of jointure of the panel 21 and the round edge section 23 is disposed laterally of the reference line 23-R so that the portion of the round edge section 23 disposed on one side of the panel 21 is slightly greater than half-round, and a relatively thin arcuate portion of the edge section 23 extends outwardly beyond the other surface of the panel 21.

The half-round portion 26 of the edge section 23 which is disposed on the side of the reference line 23-R opposite from the panel 21, is extended outwardly as indicated at 26 and 27 in Figure 1 beyond the square-cut edges of the panel 21, and are adapted to interfit with the similarly extended end portions 33 and 34 of the identically conformed panel 28 when the two are juxtaposed oppositely with the rounded edges of one panel disposed over the square-cut edges of the other, as indicated in the top view of Figure 4 and in the enlarged fragmentary view of Figure 8 in which the end 33 of the edge 30 of the panel 29 is shown overlapping the end portion 26 of the edge 23 of the panel 21.

The line of reference mentioned above, and the plane associated therewith are indicated also in Figure 8 at 23-R and, together with the view in Figure 6, clearly illustrate the manner in which the offsetting of the panel laterally of the axio-diametric center of the rounded edge 23 provides an interspace between the inner surfaces of the panels 21 and 29 when their end members are engaged as shown in Figure 8.

As has been previously indicated, the two parts 20 and 28 are identical in conformation except for a single modification made in only one of a pair of parts. In the above pair the irregularity occurs in the part 28 and is clearly shown in Figure 2 in which the rounded edge section 31 is seen to terminate in a flat generally circular surface 35 from the center of which a stub end 36 is extended; the stub end 36 being considerably reduced in length and size compared to the three normal end portions 32, 33 and 34.

Thus, when the end portions 32, 33 and 34 have been positioned behind the oppositely disposed end portions 24, 26 and 27, respectively, of the planar panel 20, the stub end 36 may be forced under mild pressure beneath the end portion 25 of the rounded edge 22, and is thereby effective to hold the two panels in facing juxtaposition. And, as has been pointed out previously, when the panels are thus engaged there is sufficient space between their inner surfaces for the positioning therein of a photographic film such as 29-P in Figure 3, together with a framing mask if one is required.

One manual method of interfitting the projecting and engaging portions of the complimentary parts of the film mounting device is clearly shown in Figures 7 to 11 which illustrate one simple method of assembly requiring no support other than the fingertips.

One panel, of a matched and mating pair, is held in each hand with the half-round portions of the rounded edge sections disposed toward each other, as indicated in Figure 7, and with the index finger of the right hand positioned adjacent the stub end 36 of the rounded edge section 31. Then the end portions 33 and 34 of the panel 28 are positioned respectively over and behind the end portions 26 and 27 of the panel 20 in the manner indicated in Figure 8, wtih the film section 38 inserted therebetween as shown in Figure 9, and the two panels are brought together as indicated by the arrows 37.

Figure 10:
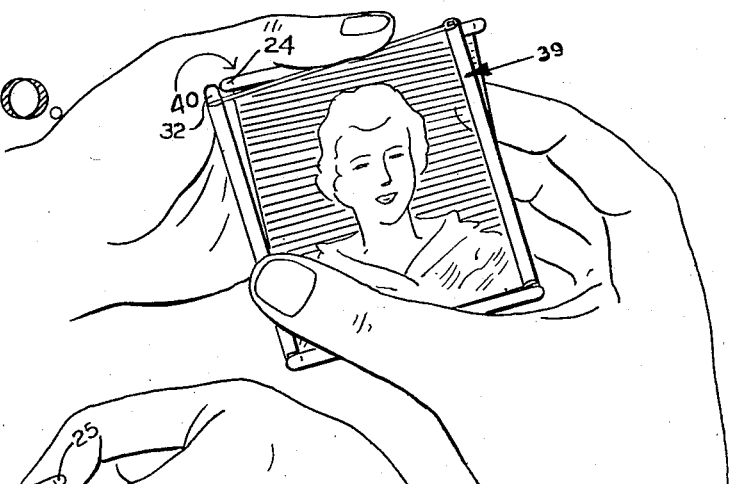
Figure 10 is a perspective view similar to that of Figure 9, showing a further step in the assembly of the parts.
Figure 11:
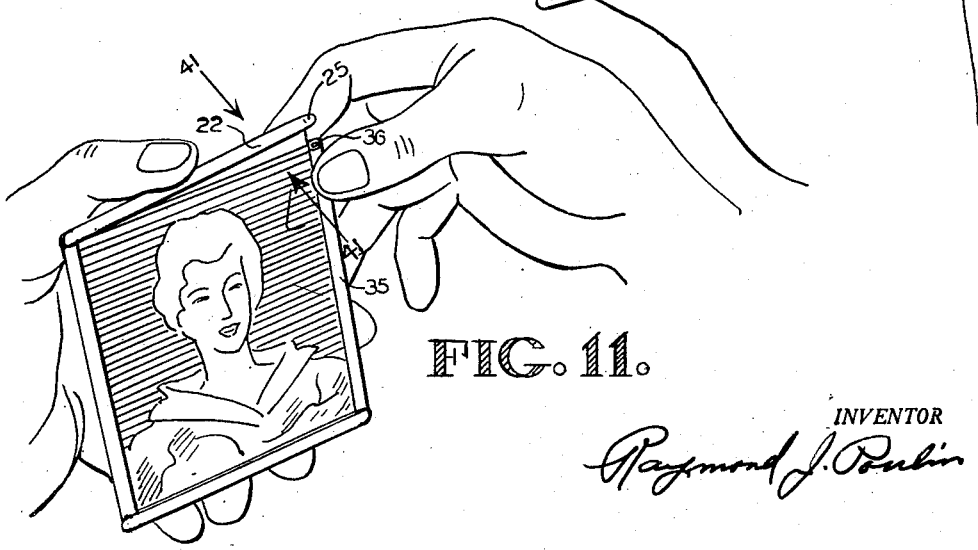
Figure 11 is a further diagrammatic perspective view showing the final step in assembling a film mount with a section of film disposed therein.

One panel is then shifted laterally relative to the other as shown by the arrow 39 in Figure 10 so that the end 32 can be moved in the direction of the arrow 40 around and rearwardly of the projecting end portion 24 of the other panel. And, finally, as seen in Figure 11, the panels are pressed together in the direction indicated by the arrows 41 so that the stub end 36 is forced under and behind the end 25 of the edge 22 of the other panel, thus holding the two panel members with a film section and a framing mask therebetween in secure but releasable engagement.

It should be pointed out that the foregoing assembly procedure is recited mainly to indicate more clearly the manner in which the structural portions of the parts interfit and cooperate to completely enclose the film section, and other manipulative procedures better suited to large scale assembly operations have been developed and will be apparent to persons familiar with the art.

It should also be noted that in the foregoing embodiment only a single end portion of lesser size, such as the stub end 36, has been employed; but the invention is intended to encompass the use of not only one but a plurality of such stub end portions, thereby further simplifying the assembly procedure. However, it is believed that the use of a single stub provides the greatest stability of the assembly and serves to minimize the possibility of the inadvertent disengagement of the parts.

One very economical and convenient specific embodiment of the mounting device is that in which the two panel members are identically conformed, each having one stub end and the ends being positioned diagonally oppositely when the panels are juxtaposed to form a frame, thereby providing attachment release points at alternate corners of the mount.

Although in order to comply with the statute my invention has been described and illustrated in considerable detail in the form of a single main embodiment, it is to be understood that these details are subject to change and variation and the embodiment is open to substantial modification, and the invention itself is amenable to adaptation into a plurality of different embodiments and therefore it is not to be restricted to the structure and particular form shown and described herein nor limited in any respect except as may be indicated by the extent and scope of the following claims.

What I claim as my invention is:

1. A film-slide mounting device, comprising: a pair of transparent generally rectangular planar panels, each having two oppositely spaced enlarged edge sections; portions of said edge sections being extended outwardly laterally of the corners of said panels, and said outwardly extended edge portions being adapted to interfit with and engage those of the other panel when said pair of panels is placed in facing juxtaposition.

2. A film-slide mounting device, comprising: a pair of planar panels being generally rigid and being rectangularly conformed of a transparent substance; each of said panels having two oppositely spaced enlarged edge sections, said enlarged edge sections being substantially circular in cross section and conformed integrally with said planar panels, and having longitudinally extended end portions being adapted to interfit with and engage the end portions of another panel placed in facing juxtaposition therewith.

3. The invention in accordance with claim 2 in which said enlarged edge sections are offset relative to the surfaces of the planar panels whereby when they are juxtaposed in interfitting engagement, space is provided therebetween, said space being adapted to receive a section of photographic film therein.

4. The invention in accordance with claim 3 in which said portions of said enlarged edge sections which are extended outwardly of adjacent sides of said planar panel, comprise: axio-diametrically parallel half sections of said circular enlarged edge sections and being integral therewith, the spaced ends of said extended portions being tapered through diminished radii to rounded points aligning in said axio-diametric plane of said circular enlarged edge sections.

5. The invention in accordance with claim 4 in which at least one of said extended portions of said enlarged edge sections is substantially smaller than the other extended portions, whereby it is engageable, under pressure, under the edge of an extended portion of an oppositely positioned planar panel juxtaposed therewith.

6. The invention in accordance with claim 5 in which one of said extended end portions on each of said panels is smaller than the other three of said extended end portions.

7. In a film slide mounting assembly, the combination comprising: a pair of planar panels being generally rigid, rectangular and transparent, each having two oppositely spaced enlarged edge sections; said enlarged edge sections being substantially circular in cross section and having longitudinally extended half-circle end portions adapted to overlap and engage those of another panel juxtaposed therewith; one of said end portions on each of said panels being substantially shorter than the others, and being engageable by direct pressure under the edge of an end portion of said juxtaposed panel; and a generally rectangular section of transparent photographic film disposed between said panels and secured therebetween by said enlarged edge sections disposed perimetrically thereof.

8. The combination of a film slide mounting assembly in accordance with claim 7, and being further characterized by masking means, comprising: a mask member conformed of thin opaque material and being dimensioned to fit closely within said perimetrically disposed enlarged edge sections and having an aperture therein, said mask member being disposed between said film and one of said panels, and said film section being centered relative to said aperture.

References Cited in the file of this patent

UNITED STATES PATENTS

| | | |
|---|---|---|
| 2,490,058 | Jablon | Dec. 6, 1949 |
| 2,505,250 | Kime | Apr. 25, 1950 |
| 2,541,575 | Davidson | Feb. 13, 1951 |